United States Patent [19]

Van Tijen

[11] 3,993,322

[45] Nov. 23, 1976

[54] BICYCLE

[76] Inventor: Reinder Van Tijen, Fazantaan 59, Dieren, Gelderland, Netherlands

[22] Filed: Sept. 11, 1974

[21] Appl. No.: 505,090

[30] Foreign Application Priority Data

Sept. 11, 1973 Netherlands............... 7312501

[52] U.S. Cl............................ 280/278; 280/281 R
[51] Int. Cl.²........................................ B62K 15/00
[58] Field of Search............... 280/287, 278, 281

[56] References Cited
UNITED STATES PATENTS

| | | |
|---|---|---|
| 1,584,314 | 5/1926 | Mamiya .................... 280/278 |
| 2,378,961 | 6/1945 | Wallace et al. ............ 280/281 |
| 2,537,325 | 1/1951 | Bowden .................... 280/281 |
| 2,777,711 | 1/1957 | Yokomaki ................ 280/287 |
| 3,015,498 | 1/1962 | Tanaka et al. ............ 280/278 |
| 3,220,748 | 11/1965 | Moulton .................. 280/287 |
| 3,292,947 | 12/1966 | Musichuk ................ 280/287 |

*Primary Examiner*—Kenneth H. Betts
*Attorney, Agent, or Firm*—Spencer & Kaye

[57] ABSTRACT

Bicycle, in particular a folding bicycle, substantially comprising elements manufactured out of rectangular strips of thin sheet material of substantially the same width which have been folded and bent and with inter-hooks composed into hollow profiles which may be filled with hard plastic foam.

7 Claims, 9 Drawing Figures

3,993,322

BICYCLE

BACKGROUND OF THE INVENTION

The invention relates to a bicycle, in particular a folding bicycle. In general bicycles are assembled from parts that are manufactured in dissimilar ways, such as pipes, lugs, axles, rims and tires and many others, which are manufactured with the aid of many and complicated machines and tools and are assembled into a complete bicycle. In case of folding bicycles an additional requirement is that of being able to part it, which is mostly realized with the rear wheel and the treadle mechanism forming the part that is attached hingeably or detachably to the other part that is composed of the handlebars and the front wheel, whereas the division has been provided in the framebeam. Moreover, it is observed that a folding bicycle in the folded or parted state in general occupies less space than in the unfolded state, but is not to be used in that folded or parted state.

It is the object of the invention to provide a bicycle that is composed of elements that can be manufactured in a simple way, substantially according to similar methods and which can be manufactured with simple tools and in particular out of light weight elements, without the solidity and the stability being impaired. A particular object of the invention is to provide a folding bicycle that is easy to carry and also in the folded state is still usable as a seat, while all parts remain connected with each other and both folding and unfolding can be done in a simple way.

SUMMARY OF THE INVENTION

According to the invention insofar as possible elements are manufactured from rectangular strips of thin sheet, which are folded and bent and combined into hollow profiles by means of interlocking.

Besides, the folding bicycle according to the invention can be folded such that it can be reduced to a minimum size without the parts being loosened from each other and for that purpose the frame beam is divided into three parts by two hinges, the center part being provided with a saddle supporting beam, a drive mechanism and the end or terminal parts each being connected to a wheel.

Preferably, according to the invention the hinges are situated at different sides of the center part and so far remote from the plane of the center part, that in the folded state the wheel supports and the wheels get positioned parallel to each other and on either side of the center part.

According to the invention it is advantageous that the central axes of the hinges intersect the beam under equal angles and preferably according to the invention the mutual distance of the central axes of the hinges is equal to the sum of the distances of the central axes to the axles of the appurtenant wheel supports so that in the folded position the axles of the wheel supports become coaxial.

In order to restrict the width of the folded bicycle it is advisable that the distance from a central axis to the axle of the treadle drive mechanism differ from the distance from the central axis of the axle of the appurtenant wheel support so that the treadle axle is parallel but not co-axial with a wheel axle.

In order to achieve that the driving means do not present difficulties in folding, according to the invention the driving means is provided with a driving element, which is mounted at the same side of the frame beam as the central axis of the hinge between center and rear parts, it being advantageous when according to the invention below this hinge a guide pin for the driving cable has been mounted.

In order to achieve that the front wheel support in the folded state can be placed parallel to the rear wheel support, according to the invention the handlebars are composed of four parts hingeable with respect to each other and of which the lower ones are connected hingeably with a short beam that on the one side has been attached hingeably to the frame beam and on the other side has been connected with a front wheel support alongside which the parts of the handlebars can be folded downward on either side in such a way that the handles of the handlebars come to lie parallel to each other by the side of the upper edge of the short beam.

BRIEF DESCRIPTION OF THE DRAWING

The invention is further described and elucidated below with the aid of a drawing of an embodiment according to the invention in the shape of a folding bicycle, from which still further characteristics of the invention can be derived.

DESCRIPTION OF THE PREFERRED EMBODIMENT

Figure 1:
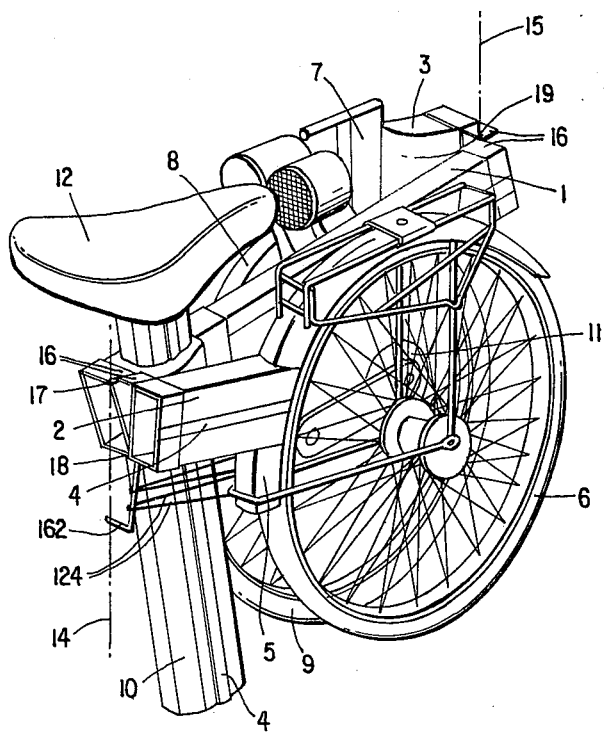
FIG. 1 shows a bicycle in the folded state in perspective.
Figure 2:
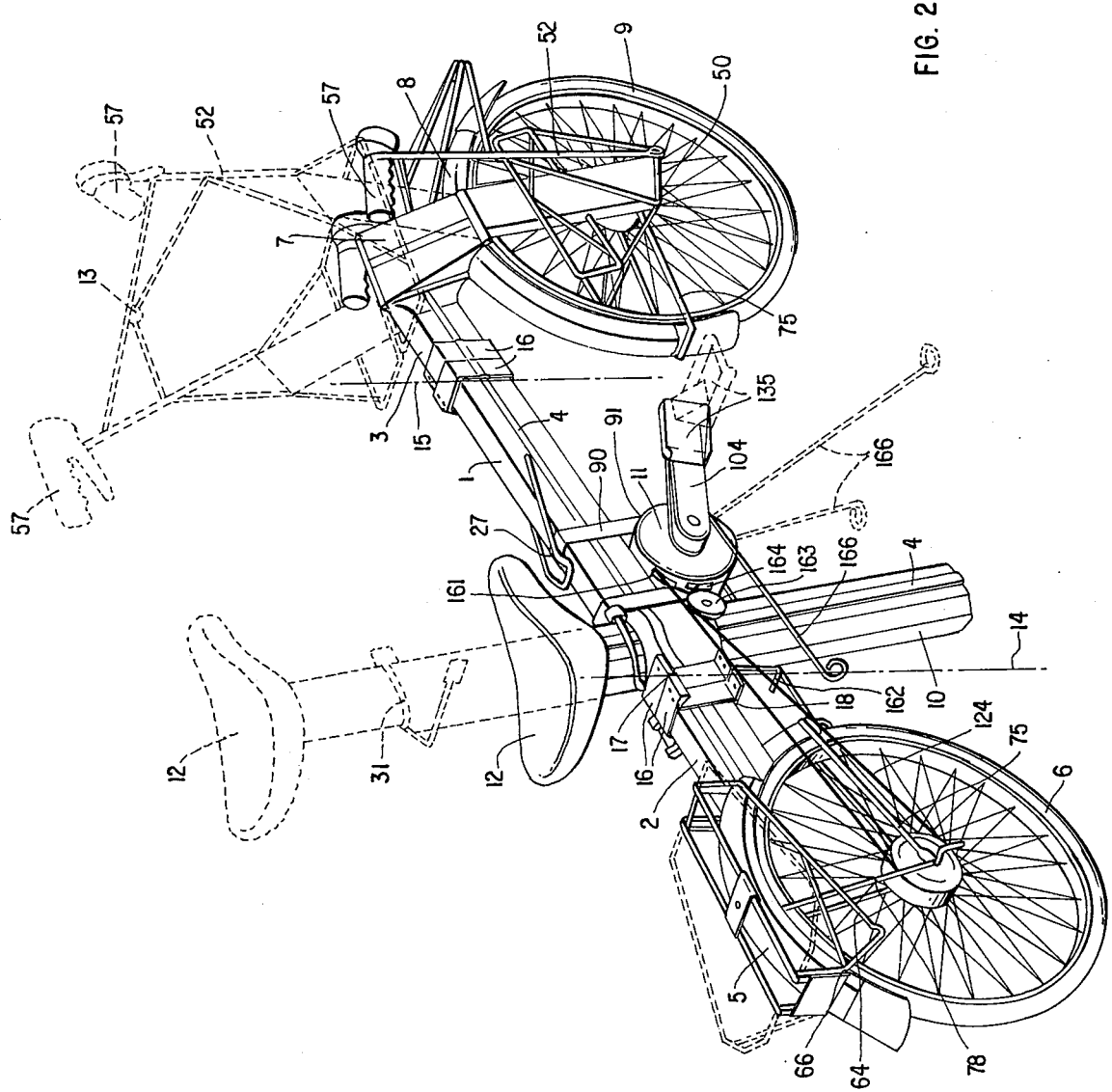
FIG. 2 shows the bicycle in partially unfolded state in perspective.
Figure 3:
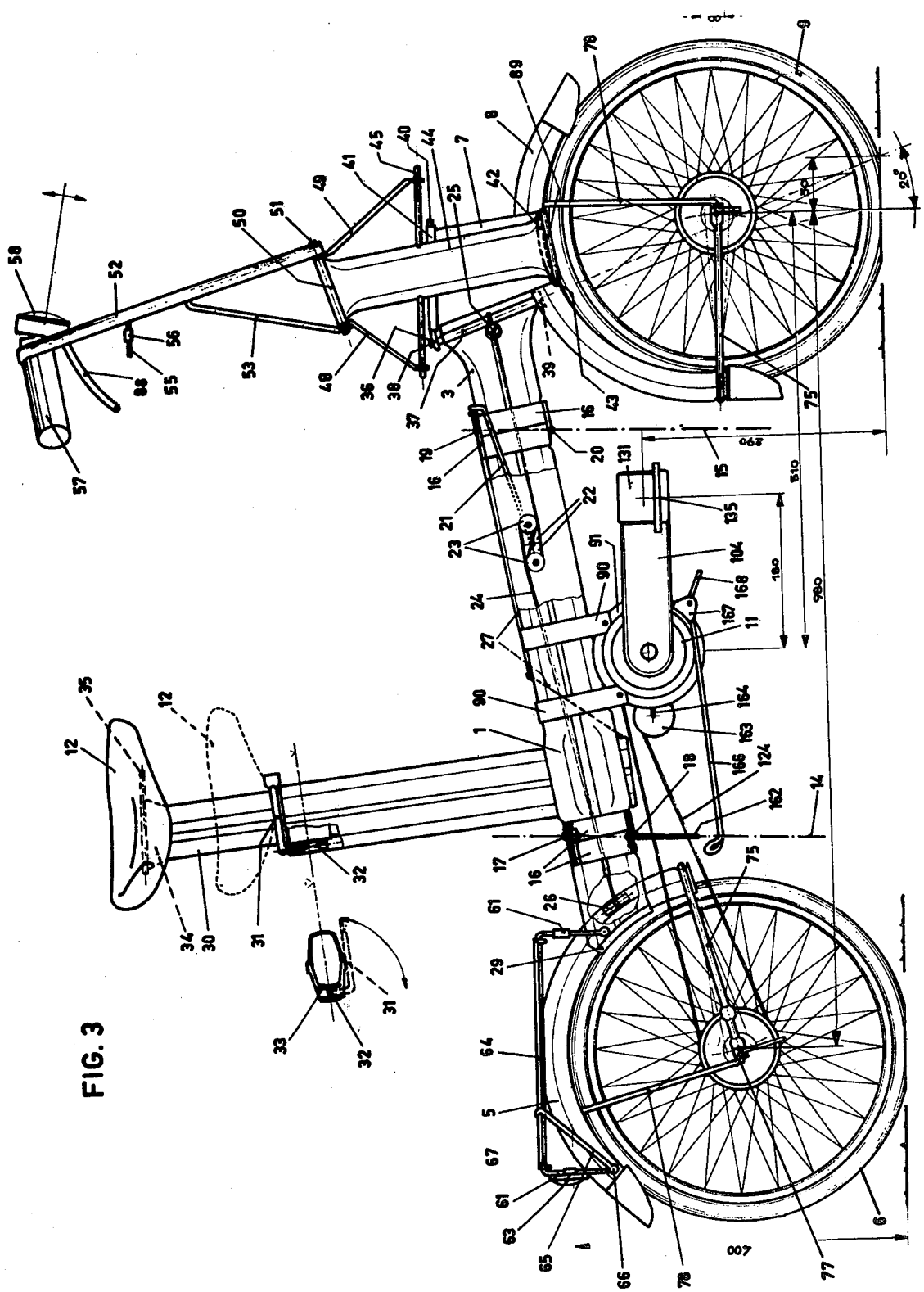
FIG. 3 shows a side view of the bicycle in the state ready for use.
Figure 4:
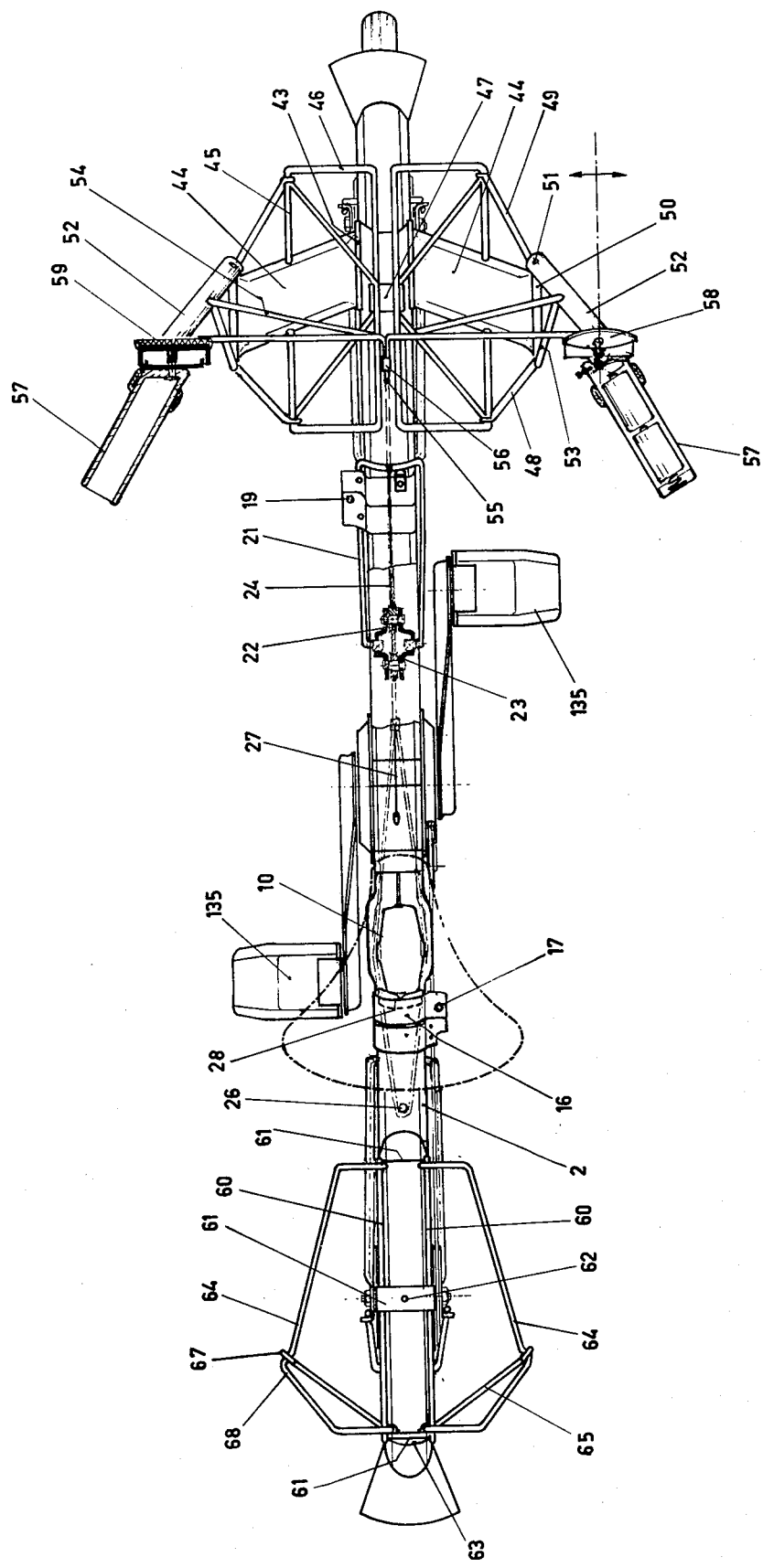
FIG. 4 shows an upper view of the bicycle.
Figure 5:
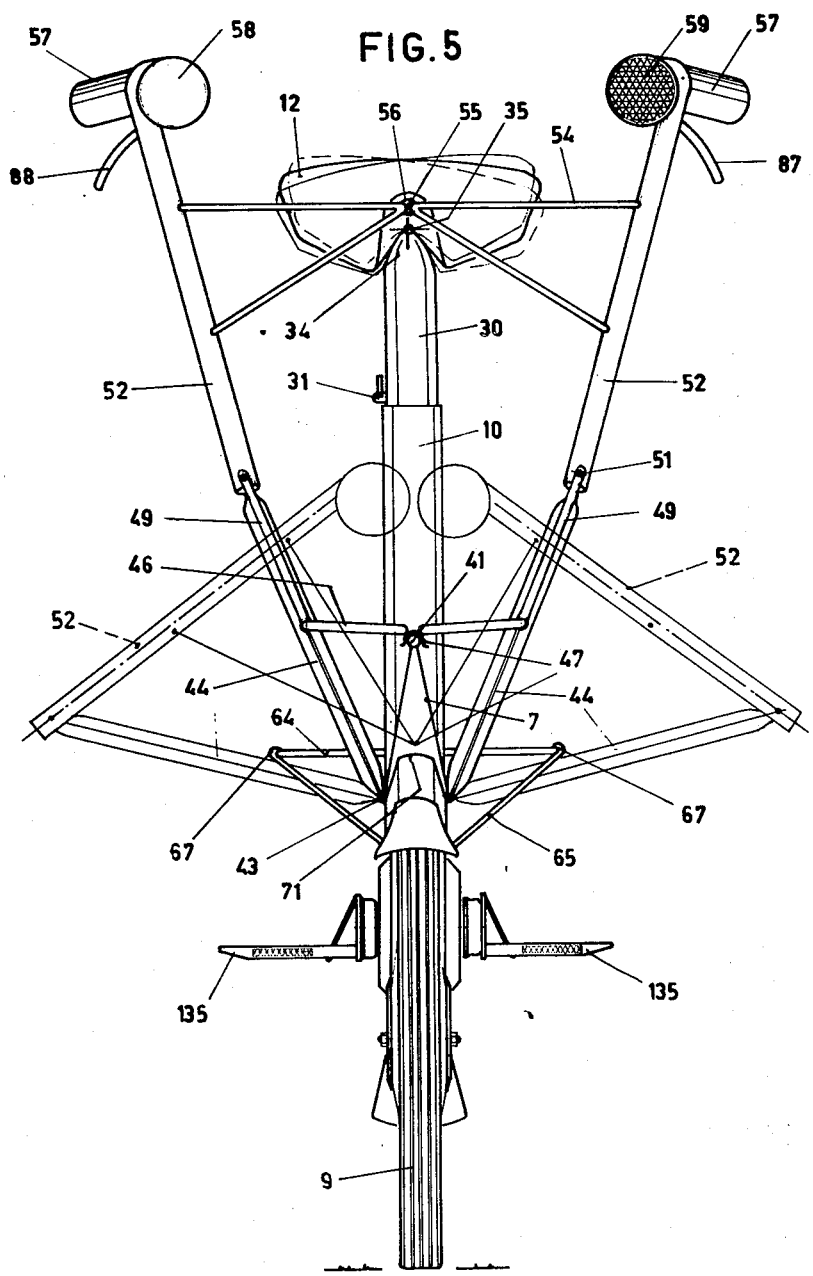
FIG. 5 shows a front view of the bicycle.

Accordng to the drawing a folding bicycle is composed of three main parts, which be means of hinges are permanently connected with each other. For that purpose a center part 1 of a frame beam is provided with a swingable rear part 2 that can fold up forwards and a swingable front part 3 which can fold backwards. These three parts each are manufactured from straight strips of thin sheet, which are folded into box-shaped profiles with interhooks 4 at the sides.

At rear part 2 a wheel support 5 is attached fixedly and in it a rear wheel 6 is provided springingly. At front part 3 a short beam 7 is fitted hingeable, and is fixedly attached to a front wheel support 8, in which a front wheel 9 is provided springingly. Front wheel support 8 has the same design as rear wheel support 5, while also the attachment to short standing beam 7 corresponds with the attachment of rear wheel support 5 to rear part 2. Wheels 6 and 9 are constructed in the same way and are of the same size.

In center part 1 of the frame beam an opening is provided in which a saddle supporting beam 10 is mounted movably and fixably. Saddle supporting beam 10 has also been folded from straight strips of thin sheet, which are connected by means of interhooks 4.

Below center part 1 for saddle supporting beam 10 a treadle drive mechanism 11 is suspended, which in the folded state of the bicycle finds a place between wheels 6 and 9. In that folded position saddle supporting beam 10 has been brought into the lowest position with respect to center part 1, and the lower part of beam 10 with the bases of wheels 6 and 9, which are folded next to each other, forms a threepoint set-up on the ground, which is stable to an extent that a saddle 12 on saddle supporting beam 10 can serve as a seat. In order that front wheel 9 can be folded next to rear wheel 6 it is necessary that handlebar system 13 can also be folded and for that purpose this handlebar system 13 is composed of a number of parts that to the left and to the right of short beam 7 and wheel support 8 are folded downward to below the level of saddle 12. In the folded position of the bicycle it only occupies the space of a large handbag, where it also offers a comfortable seat.

The frame beam composed of parts 1,2 and 3 runs from rear wheel support 5 slantingly upwards to above front wheel support 8 and so as to achieve the wheels 6 and 9 in the folded state come next to each other, central axes 14 and 15 of the hinged joints between rear parts 2 and center part 1 and between center part 1 and front part 3 run at different sides of center part 1 and under acute angles with the direction of the frame beam. In the embodiment drawn central axes 14 and 15 are vertical and the distance between these axes is equal to the sum of the distances from central axis 14 to the axle of rear wheel 6 and from central axis 15 to the axle of front wheel 9. In this way in the folded state of the bicycle the axles of the wheels are co-axial. The distance between central axis 14 and the axle of treadle drive mechanism 11 is smaller than the distance from central axis 14 to the axle of rear wheel 6, so as to avoid that the axle of treadle drive mechanism 11 also comes to lie in the center between the axles of wheels 6 and 9, so that the width of the bicycle would become very large.

The hinge joints in central axes 14 and 15 are provided in straps 16, which have been passed around the ends of frame beam parts 1,2 and 3 that are directed towards each other. Each of these straps 16 consists of two U-shaped folded strips between which the box-shaped profile of the end of a part 1,2 or 3 has been clamped and attached, while the legs of the strips protrude at the sides of the parts and are interconnected. Between rear part 2 and center part 1 protruding straps 16 at the upper side form a hinge joint 17, which lies at the side of center part 1 and at the lower side a hinge joint 18, which lies at the side of rear part 2. Then central axis 14 through hinge joints 17 and 18 lies laterally at a distance from frame beam parts 1 and 2 and intersects the dividing plane between those parts under an acute angle at the height of interhooks 4. In the same way but at the other side of center part 1 by straps 16 an upper hinge joint 19 is formed at the side of front part 3 and a lower hinge joint 20 at the side of center part 1, which hinge points lie in central axis 15.

For reinforcement of the ends of frame beam parts 1, 2 and 3 directed towards each other, in the interior of the box-shaped profiles at the location of straps 16 additional fillings provided with central openings have been placed.

Because of the position of hinge joints 17,18,19 and 20 in straps 16 lateral next to frame beam parts 1,2 and 3, i.e. hinge joints 17 and 18 with central axis 14 at the righthand side of the frame beam and hinge joints 19 and 20 with central axis 15 at the left-hand side of the frame beam, rear and front parts 2 and 3 can be swung such that they come to lie in substantially parallel vertical planes with center part 1 in the middle. Because of the equal angles which central axes 14 and 15 form with the main direction of the frame beam parts, it is possible that, upon swinging the wheels remain at the same level. The angles which central axes 14 and 15 form with the main direction of the center part 1 of the frame beam need not be equal, but then the distances from the wheel axles of wheels 6 and 9 to the intersections of central axes 14 and 15 with the main direction must be chosen such that upon folding, the axles of the wheels become coaxial. a construction providing equal angles and providing parallel vertical central axes 14 and 15, and with distances between the central axes and the appurtenant wheel axles whose sum is equal to the distance between central axes 14 and 15, can however be realized in the most simple way.

Locking of parts 1,2 and 3 in the unfolded position is obtained with a clamping construction lying within the frame parts. A clamp lever 21 embraces center part 1, the ends of the lever being inserted through openings and being provided with square or rectangular tips that are inserted in links 22, which support rollers 23. Over rollers 23 a tensioning wire 24 has been passed, which with the front side in front part 3 is attached at the strongest place at the front with the aid of an adjusting screw 25 and at the rear side is divided into two wires that within center part 1 pass around saddle supporting beam 10 and with an anchor 26 are fixed in rear wheel support 5, which is mounted against rear part 2. In the folded position of the bicycle lever 21 is swung towards saddle supporting beam 10 and gives tensioning wire 24 sufficient slack so as to enable the front and rear parts to freely swing around central axes 15 and 14. When frame beam parts 2 and 3 with the components connected to them are swung as far as the unfolded position with center part 1, lever 21 is turned and tensioning wire 24 with great force draws towards each other the extremities of parts 1,2 and 3 that are directed towards each other. Moreover, adjusting screw 25 in front part 3 is provided to adjust the length of tensioning wire 24 and the tensile force properly.

Clamp lever 21 is, however, also connected to a pulling wire 27, which passes right across center part 1 and is connected to the base of saddle supporting beam 10. So, when clamp lever 21 is turned, also saddle supporting beam 10 in center part 1 can be moved upward or downward. So as to secure saddle supporting beam 10 in the highest position, to tensioning wire 24 behind saddle supporting beam 10, moreover, a clamping means 28 is provided, which while tensioning the wire 24 locks saddle supporting beam 10. In order to be able to secure clamp lever 21 in the end position it is bent such that one leg can be hooked behind the lugs of straps 16, which form hinge joint 19.

Because it must be possible to adjust saddle 12 at different heights, in saddle supporting beam 10 a slidable extension 30 is provided, which also is constructed out of folded strips of sheet that are interhooked. This extension can be locked at different heights because at the upper end of saddle supporting beam 10 a lock 31 is provided with a bent-over long rectangular end 32 which reaches into saddle supporting beam 10 and upon turning presses a pressure plate 33 against extension 30. Extension 30 at the upper side is provided with a flattened end 34, which forms a center of rotation for a saddle pin 35, which is slidably coupled with saddle 12. In this way saddle 12 can somewhat swivel around the saddle pin so as to facilitate the lateral movement of the body of the rider.

Front part 3 of the frame beam is flattened out into a hinge 37 which is connected with a pin 38 to a short standing beam 7 of handlebar system 13, which pin 38 bears in a cup 39 of front wheel support 8. The lower side of hinge 37 also bears on cup 39. At the upper side pin 38 is locked by an eye 36 of a pin 40 which is attached in upper end 41 of short standing beam 7 which also is constructed out of folded strips of sheet which have been interhooked. The lower sides of short standing beam 7 are attached to front wheel support 8 with clamps 42. To these clamps 42 straps 43 are provided around which side plates 44 are hingeable. Side plates 44 have been constructed out of folded strips of sheet which are interhooked and about in the middle rods 45 are housed, which protrude forward and backward and form part of frames 46, which can be fastened around upper end 41 of the short standing beam 7 with a clip. Frames 46 have been formed out of wire and are supported, moreover, by supporting arms 48 and 49, which run upwards from the ends of rods 45 and are suspended in an axle 51 at upper edges 50 of side plates 44. Besides supporting arms 48 and 49, around this axle 51 an upper steering linkage 52 and a reinforcing rod 53 have been attached hingeably. The front end of axle 51 is bent somewhat so that in folding upper steering linkage 52 this can carry out a slight turn around its axis, in order to achieve that handle grips 57 in folded position of handlebar system 13 are situated parallel to each other, moreover, in upper steering linkage 52 connecting members 54 are attached, which in a coupling point 55 are connected permanently, but hingeably with each other while in unfolded position of the handlebar system 13 these members 54 are fixed with respect to each other by a lock 56.

When handlebar system 13 is folded in, supporting frames 46 are loosened from upper end 41 of short standing beam 7 and turned to side plates 44. Upper steering linkages 52 are also turned up, connecting members 54 being folded together and forwad around coupling point 55. Upon unfolding, upper steering linkages 52 are raised, while they are hinging around axles 51, while side plates 44 swivel around hinges 43 and connecting members 54 unfold around coupling point 55.

If then supporting frames 46 are turned up and are attached on upper end 41 of short standing beam 7 with clip 47, the lower part of the handlebar system 13 is fixed. By closing lock 56 around connecting members 54, also the upper part of the handlebar system 13 is fixed.

At the upper side of the upper steering linkages, handle grips 57 are attached. In one of the handle grips a set of batteries can be provided for a spotlight 58, which can be manipulated by hand and onto the other handle grip 57 a reflector 59 can be mounted, the cup of which can also be used as a bell. In the unfolded position of handlebar system 13, handle grips 57 are directed outward, but by applying appropriate angles in the bends of axles 51 and between axles 51 and hinges 43 and an adequate dimensioning of the length of side plates 44 and upper steering linkages 52, it is possible that in the folded position of the handlebar system handle grips 57 come to lie parallel to each other with upper end 41 of short standing beam 7 between them.

With handlebar system 13 constructed in this way, between side plates 44 and upper steering linkages 52 a protected space for luggage is obtained, which, if necessary, can serve as a children's seat, because in the unfolded position of the bicycle supporting frames 46 bear on short standing beam 7 and have been locked with it.

On rear part 2 and rear wheel support 5 also a foldable parcel carrier is provided. It is mounted on two frames 60, which are placed vertically, and are coupled with each other by means of three equal connecting plates 61, while the ends bent downward are attached to rear part 2 and rear wheel support 5. Center connecting plate 61 is attached to rear wheel support 5 with a rivet 62 and hindmost connecting plate 61 bears rear light or reflector 63. In the angular points of the frames bent rods 64 hinge, which in folded position suspend downward past frames 60. Supporting rods 65 are provided, however, which are rotatable at connecting points 66 on frames 60 and can slide around rods 64 with eyes 67. In these rods 64 a bend 68 is provided and in the unfolded position eyes 67 engage with bends 68 and in so doing fix rods 64 in the horizontal plane. As a result of the bent shape of rods 64, in this plane a saddle-shaped platform is produced. When eyes 67 are lifted out of bends 68 they slide to the center by rods 64, which then go downward of themselves.

Figure 6:
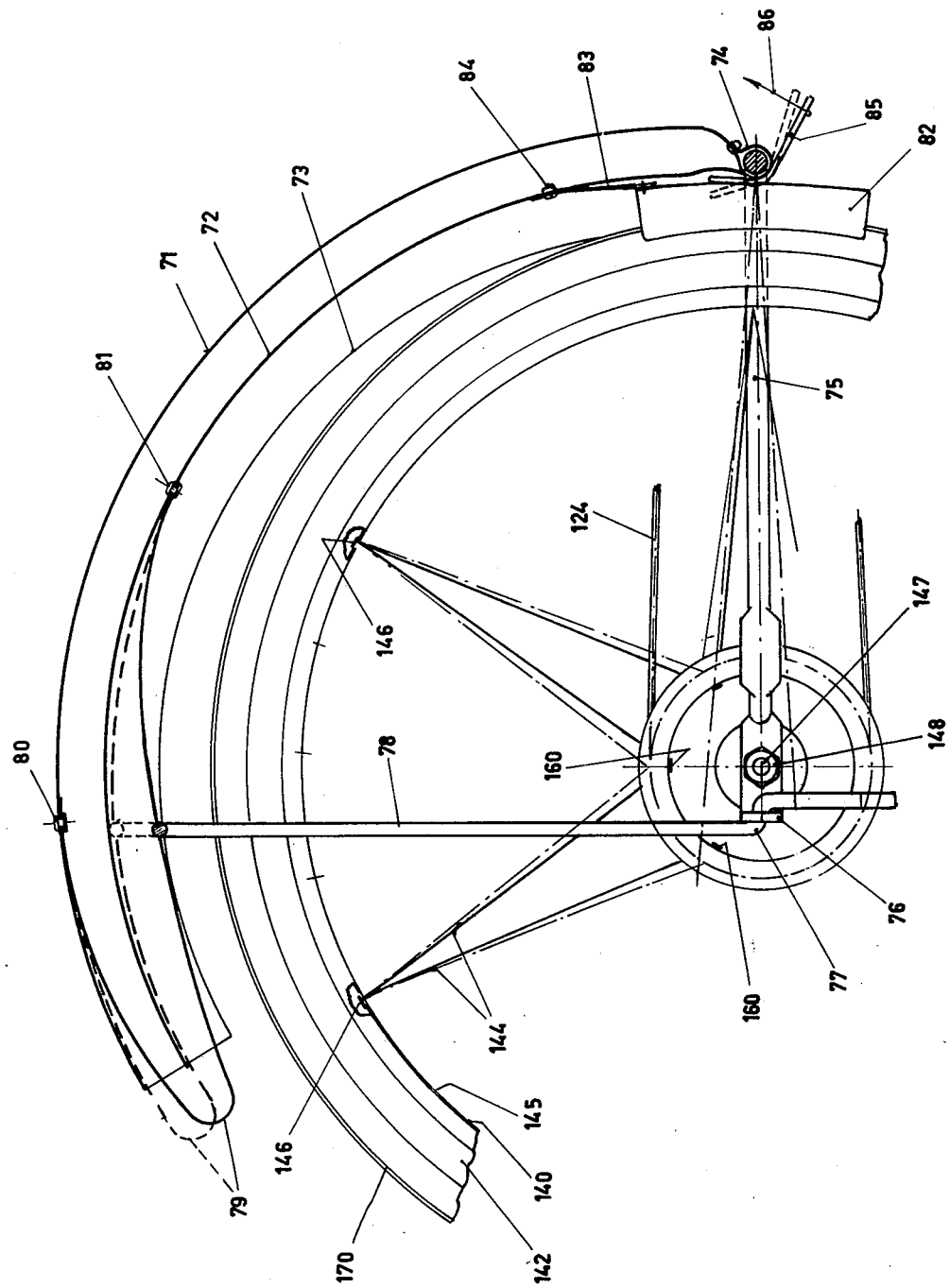
FIG. 6 shows a view and partial section of a wheel support with a wheel.
Figure 7:
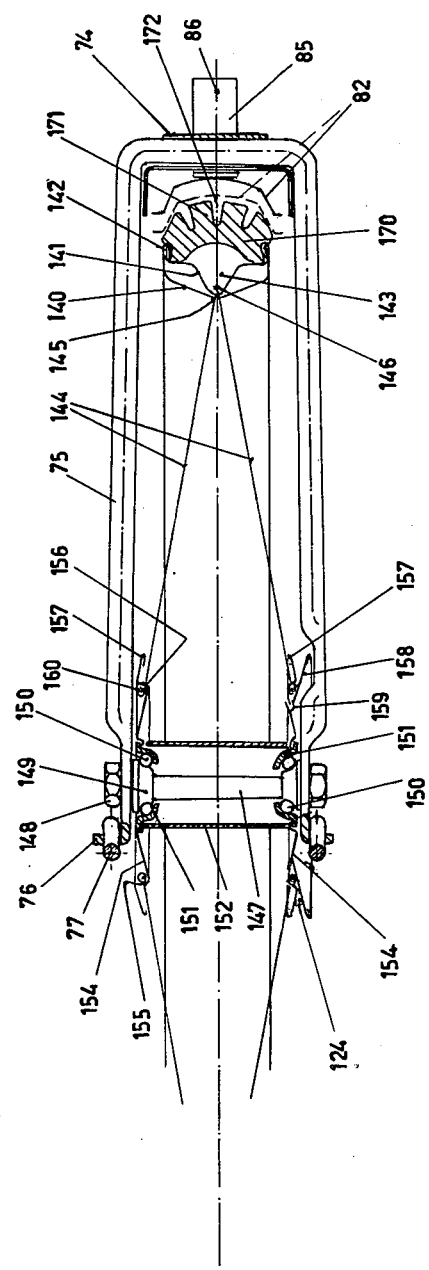
FIG. 7 shows a section over a wheel support with a wheel.

Like all parts of the frame folded out of substantially rectangular strips of sheet metal the wheel support (FIGS. 6 and 7) is also formed out of folded and bent straight strips of sheet, i.e., a strip 71 which forms the outer side and a strip 72, which forms the inner side. The folded strips are connected with each other in the correct shape by means of an interhook 73. At the end the strips are flattened and bent into a hook 74 with a cylindrical cavity. In this hook a U-shaped guiding frame 75 is inserted for the wheel. Ends 76 of the legs of frame 75 are flattened, provided with bores and also folded at right angles. In the hindmost bores there are inserted doubly bent legs 77 of a second U-shaped support member 78, which takes the vertical load and forms an approximately right angle with guiding frame 75. The upper end of support member 78 is connected with a looped plate spring 79, which with rivets 80 and 81 has been attached to bent strips 71 and 72. The looped plate spring flattens and bears itself against the strips under changing load and in this way a suitable spring characteristic can be obtained without local high stresses. A wheel mounted in this wheel support can be sprung in an excellent way.

Near hook 74 a brake shoe 82 is provided, which is suspended from a plate spring 83, which with a rivet 84 is attached to strip 72. In brake shoe 82 also a lever 85 is inserted which can turn about hook 74 and when a brake wire 86 is pulled brake shoe 82 is pressed against the conical sides of the tire. In a way known in the art brake wire 86 is guided with a bowden cable to a brake lever 87 on handlebar system 13. Because brake shoe 82 has been provided at the location of guiding frame 75, effective braking is effected independent of the spring movement of the wheel in the wheel support.

Figure 8:
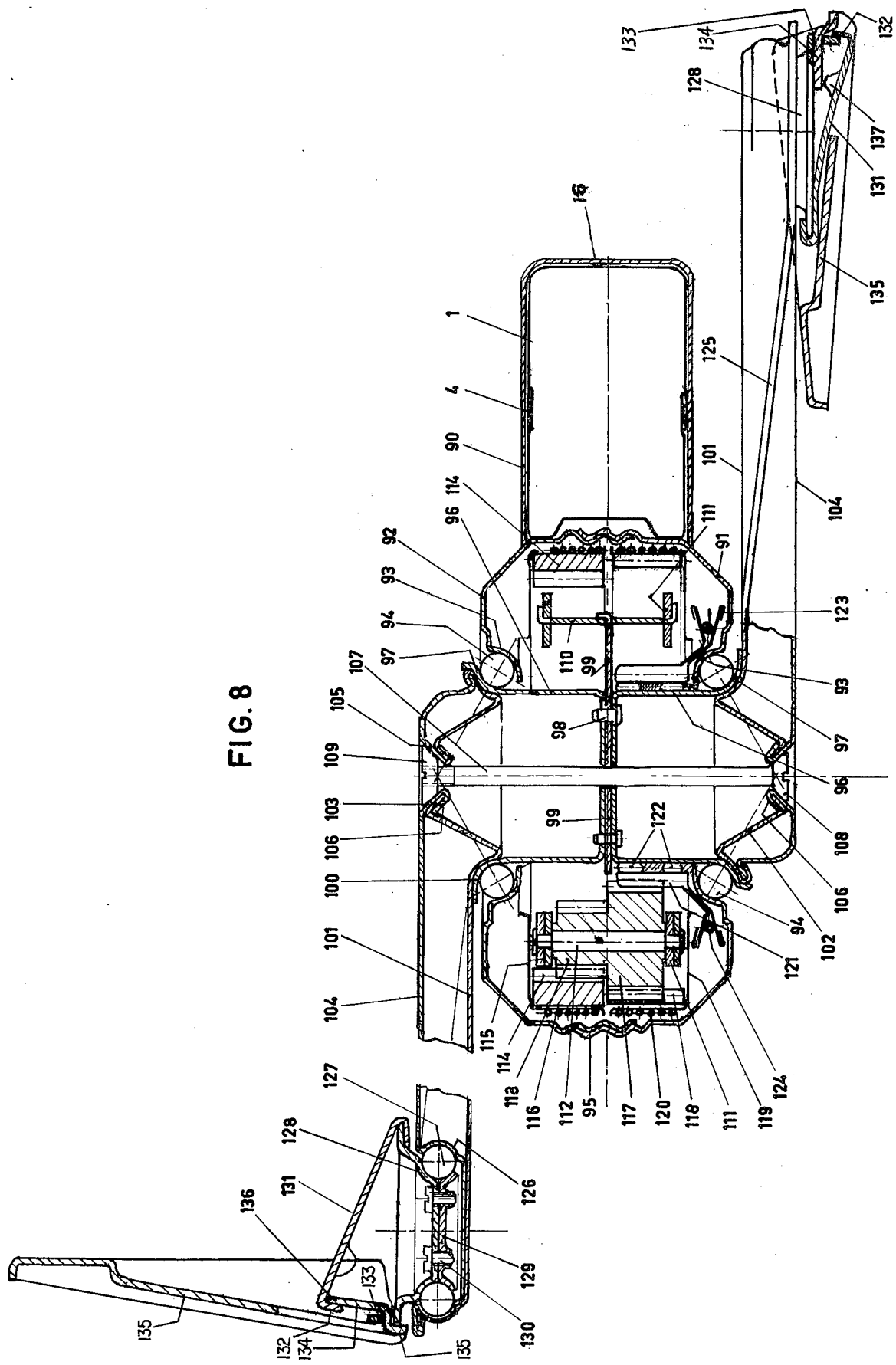
FIG. 8 shows a section over the treadle drive mechanism.

Treadle drive mechanism 11, which is specified in FIG. 8 has been suspended from center part 1 of the frame beam and in front of saddle supporting beam 10. So as to obtain a correct positioning of the treadle drive mechanism 11, center part 1 is indented at the lower side into a bearing surface for the housing of circular treadle mechanism 11, which with straps 90 is suspended from center part 1. The housing is formed by two substantially equal housing parts 91 and 92, which preferably have been deepdrawn from thin sheet. At the inner side each housing part is provided with outer ball bearing race 93 for balls 94 and at the outer side with a corrugated screw thread 95. Housing part 91 at the side has openings for the passage of a drive cable of the wheel drive and for that reason must be attached fixedly with respect to center part 1. Housing part 92 is adjusted rotatably with the aid of screw thread 95 until the correct clearing of outer ball-bearing races 93 has been obtained and only then fixed. By disconnecting the fixation at straps 90 housing part 92 can be adjusted by means of rotation and after the adjustment again be fixed in a better position.

On balls 94 in outer bearing races 93 runs a treadle axle. The latter is formed by two identical deepdrawn cups 96, which are supported on balls 94 with inner ball bearing races 97. Cups 96 are interconnected by pins 98 while a center plate 99 is interposed. Pins 98 transmit the treadle drive couple from cup 96 to center plate 99. The outer sides of bearing races 97 form cups 100 for inner plates 101 of the cranks. Like substantially all parts, the cranks are also formed out of strips of sheet that have been flanged and drawn in the correct shape and connected with each other by means of interhookings.

Within cups 100 inner plates 101 are forced out into cones 102 with an other cone 103 in the opposite direction in the center. outer plates 104 of the cranks in the center are provided with a cone 105, whose edges 106 are interhooked around countercones 103. Now both cranks are combined with cups 96 and center plate 99 into one unit with the aid of a bolt 107 with a head 108 and a nut 109, which fit in cones 105.

Center plate 99 is star-shaped at the circumference and bears straps 110 at its points, which hold fast links 111. Links 111 over the circumference are divided into rings that mutually are coupled with bearing pins 112. An odd number of bearing pins 112 is provided and preferably five. Bearing pins 112 form the axles of planet gear wheel sets of which a small cog wheel 113 works together with a toothed rim 114, which is fixed into a sleeve-shaped holder 115, which is enveloped by a helicoidal spring 116, while a larger cog wheel 117 works together with a toothed rim 118, which is fixed in a sleeve-shaped holder 119, which is enveloped by a helicoidal spring 120. Cog wheels 113 and 117 may be made out of solid material, but may also consist of packets of thin sheets, the peripheries of which have been drawn cylindrically and stamped into the shape of toothed wheels, which plates are connected robustly with each other. Toothed rims 114 and 118 preferably have been made out of strips bent in the teeth forms, which strips are fixed in deepdrawn sleeve-shaped holders 115 and 119.

Larger cog wheel 117 furthermore cooperates with a central tooth ring 121, which runs on needles 122 running on a cup 96. Central tooth ring 121 is connected with a V-disc 123 in which works a circular endless driving cable 124, which goes to rear wheel 6. Preferably, central tooth ring 121 consists of two parts of sheet, one part, which is corrugated according to the teeth form and furthermore extends conically outward and forms a flank of V-disc 123 and an other part which has been cylindrically drawn and forms the outer bearing ring for needles 122 and furthermore also extends conically outward and forms the outer flank of V-disc 123.

The connections between the corrugated teeth forming strips of toothed rims 114 and 118 and sleeve-shaped holders 115 and 119 and between the parts of central tooth ring 121 can be effected by soldering, but it is advisable that the cavities behind the toothed flanks be filled with non-compressible material, in order to prevent deformation. Helicoidal springs 116 and 120 are coiled around sleeve-shaped holders 115 and 119 along with the loaded direction of rotation, the initial part of the springs being anchored in housing parts 92 and 91. On single helicoidal spring 116 and 120 can also be replaced by two adjacent springs for the better centering of a sleeve-shaped holder. The end of helicoidal coupling spring 116 belonging to toothed rim 114 with the smallest diameter with the last winding lies slightly clamping around holder 115. The end of helicoidal coupling spring 120 is connected with a bowden cable that is not shown in the drawing to a handle 88 on handlebar system 13. Upon tightening the end of helicoidal coupling spring 120 sleeve-shaped holder 119 is held, but because of the difference in diameter of cog wheels 113 and 117 toothed rim 114 starts rotating in a direction in which it releases helicoidal coupling spring 116 and holder 115 becomes freely movable in the latter. With this gear mechanism two speeds can be adjusted according to choice.

The cranks, which as described before, are composed of strips of sheet, an inner plate 101 being drawn into cones 102 and 103 at the treadle axle and an outer sheet 104 at that location only being equipped with a cone 105, at the treadle side are provided with foldable treadles. On the treadle side, outer plate 104 has been substantially deformed and interhook 125, which connects both plates, consequently runs diagonally over the length of the crank from cups 100 as far as a bearing ring 126, which has been formed in outer plate 104. In this way interhook 125 with its triple material thickness contributes to the solidity and stability of the cranks in the places that are most heavily loaded.

In bearing ring 126 balls 127 run, which are held by a two-part inner bearing ring, consisting of a cup 128 and a washer 129, which are attached to each other with bolts 130. The outer side of cup 128 is square and at one side a plate spring 131 is attached, which ends in a hook 132. The opposite side of cup 128 is bent-over locally and provided with a slot-shaped eye 133. Through this eye a bent lug 134 of a treadle plate 135 passes. By punching out lug 134 and bending it a rim 136 is produced behind which hook 132 of plate spring 131 can engage and treadle plate 135 can be fixed in unfolded position.

In folded position of treadle plate 135 hook 132 engages behind eye 133 and a projection 137 of plate spring 131 presses treadle plate 135 right against cup 128, the sides of the treadle plate being enabled to fall on either side alongside interhook 125 and as a result are enabled to secure the treadle against rotation.

In wheel supports 5 and 8 respective wheels 6 and 9 are provided. In the same way as the other parts these wheels are composed of rectangular strips of thin sheet with interhooks. The rim is hollow and consists of a bent-over and bent outer rim 140 in which an inner rim 141, also bent-over and bent, has been provided, the abutments having been provided in such a way that they are displaced far from each other. At the outer periphery both rim parts are interconnected with interhooks 142. In inner rim 141 lies a cavity 143 in which the attachment of the rims with spoke wire 144 to hub plates is effected. In rim parts 140 and 141 corresponding openings 145 are distributed over the circumference, through which loops of spoke wire 144 pass, which with small pins 146 are held in cavity 143.

On a wheel axle 147, which can be fastened with nuts 148 in bores of flat ends 76 of guiding frame 75 cones 149 are situated on which balls 150 work, which have been enclosed in cups 151. Cups 151 are held at a distance by a hub sleeve 152, which preferably is made out of a coiled strip of sheet. Between cups 151 and hub sleeve 152 hub plates 154 are situated. Hub plates 154 are provided with bearing edges 155 bent inward, in which openings 156 are provided for loops of spoke wire 144. Further to the outer periphery the hub plates are provided with a flanged edge 157. At rear wheel 6 an additional hub ring 158 with lugs 159 is attached and this hub ring together with a hub plate 154 forms a V-disc for driving cable 124, which comes from drive mechanism 11.

Before the wheel is woven, spoke wire 144 is coiled on an auxiliary device such as a flat rectangular plate, so that it is bent into loops in the right places. Weaving is done in such a way that the loops are alternately passed through openings 145 of the rim and through openings 156 of hub plates 154, which lie right next to each other and have not yet been separated by hub sleeve 152. A loop in the rim is locked with a small pin 146, a next loop is inserted into a hub plate 154 and locked with a small pin 160, the next loop in turn is locked in the rim and the next loop in the other hub plate. When the wheel has completely been woven roundabout the ends of spoke wire 144 are locked. Because the loops have been bent previously, the available spoke lengths are equal to each other and because each loop per se has been locked with a small pin, spoke wire 144 cannot be pulled out. In case of a fracture in one of the spokes formed the rest of the spokes do not come loose but remain under tension. The tension is only obtained, however, when in case of the fully woven wheel the hub plates are pulled from each other and separated by the introduction of hub sleeve 152. The latter, preferably, has been split or formed out of a coiled strip and is inserted through the central opening of a hub plate. When cups 151 are pressed into the hub sleeve, it is expanded and fixes hub plates 154 at the right mutual distance. Because the wheels have a rather small diameter, forcing hub plates 154 from each other produces sufficient tension in spoke wire 144.

The connection between treadle drive mechanism 11 and rear wheel 6 is formed by a driving cable 124. This cable 124 preferably, is of circular cross-section and preferably is manufactured of rubber or plastic lining with a steel core. On the one hand it is laid around disc 123 in the treadle drive mechanism 11 and through a slit-shaped opening 161 in housing part 91 emerges to the outside and on the other hand is laid around the V-disc formed by flanged edge 157 of hub plate 154 and hub ring 158.

The cable drive between treadle drive mechanism 11 and rear wheel 6 lies at the side of central axis 14 of the frame beam below hinge joints 17 and 18. A driving cable of circular cross section 124 is applied because it can bend in all directions. When rear part 2 is swung the driving cable is also doubled up. So as to support cable 124 in so doing, below hinge joint 18 at center part 1 of the frame beam an additional hooked guide pin 162 is provided. As a result, the bent loops of driving cable 124 are caught and the possibility that the cable falls out of the V-disks becomes very slight. In the stretched position of the frame beam it is of importance that driving cable 124 is also under the correct tension and therefore, at treadle drive mechanism 11 an additional tensioning roller 163 is provided, this roller being mounted on a lever 164 is and being springingly attached in housing part 91.

Under treadle drive mechanism 11 an additional standard is provided whose legs 166 in the folded position are parallel to the frame beam but in the unfolded position are spread. They are mounted in projections 167 of housing parts 91 and 92 and provided with a stop 168, which in the unfolded position rests against housing parts 91 and 92. The standard is made of spring steel wire, which is sufficiently stiff to keep the bicycle in balance but bends away under greater load so that treadle drive mechanism 11 is not overloaded or deformed.

In the rim of the wheels lies a tire of rubber or plastic with a body 170, which is flat but if bent is tensioned between interhooks 142 of rim parts 140 and 141. On this body 170 four longitudinal ridges 171 are provided with slits 172 between them. When the tire is in unloaded condition, slits 172 are open but when the tire is loaded and bears on the ground the tread of ridges 171 is depressed. This means that slits 172 between the ridges become narrower and body 170 is pressed flatter into rim cavity 143. The tire can be endless but also may be manufactured as an extruded profile in which a butt weld can be provided.

If the application of a butt weld is difficult, the profile coiled around the rim can be made into a tire by applying bracing wires in slits 172, Slits 172 have the drawback that they can get filled with dirt so that the flexibility of the tire may be lost or strongly reduced. A solution for this is to provide, instead of slits 172, in the inner part of the profile, cavities that are closed under load. Then with a butt weld the profile must, however, be formed into an endless tire.

Figure 9:
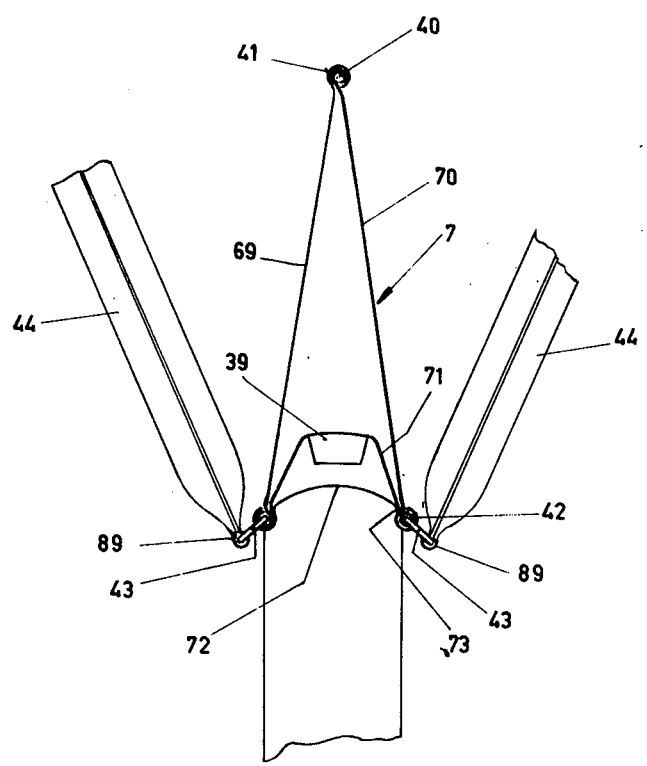
FIG. 9 shows a section over a wheel support at the location of the short beam and the lower parts of the handlebars.

Finally in FIG. 9 an additional detail is given of the attachment of wheel support 8 to short standing beam 7 at the location of handlebar system 13. Side plates 69 and 70 of short standing beam 7 at the lower side run together with interhooks 73 of wheel support 8 in clamping bushes 42, which are hollow and bent according to the curvature of the interhook. In clamping bush 42 a leg of a strap 43 is inserted whose other leg is straight and forms the hinge for side plate 44 because this leg is inserted in a clamping bush 89, which is mounted at the lower edge of side plate 44.

At the upper side of short standing beam 7 side plates 69 and 70 join each other and are inserted in a clamping bush 41, which forms the upper end of short standing beam 7. The side plates are held in clamping bush 41 because in the cavity of the clamping bush pin 40 has been driven. The protruding part of the latter forms eye 36, which holds the upper side of pin 38. Then hinge 37 is enclosed between eye 36 and cup 39.

The attachment of rear wheel support 5 is effected in a corresponding way, the side plates of part 2 together with interhooking 73 being inserted in bent clamping bushes 29 and fixed with a pin.

Extension 30, too, which at the upper side is provided with a flattened end 34, can be provided with a clamping bush in which saddle pin 35 is rotatable. Hinge 37 of front part 3 of the frame beam can also be provided with a clamping bush in which the side plates are clamped and which supports pin 38.

It may be advisable to fill all hollow parts of the bicycle with hard plastic foam so that very thin sheet can be used, while formation of rust in the interior is avoided and also resonating, if any, of the sheet material is prevented.

I claim:

1. In a folding bicycle having a frame divided into at least two parts, one of which is a front part, the two frame parts being hingeable with respect to one another, the improvement comprising a handlebar system composed of four parts hingeable with respect to each other, two lower parts of said handlebar system being hingeably connected with a short standing beam which on the one side is attached hingeably to the front frame part and on the other side is connected with a front wheel support, alongside which the parts of the handlebar system are foldable downwardly on either side, the length of said parts of said handlebar system being such that in the folded position the handle grips connected to the upper parts of the handlebar system come to lie parallel to each other next to the upper edge of the short standing beam.

2. A folding bicycle as defined in claim 1 upper parts of said handlebar system are permanently inter-coupled by hingeably interconnected coupling straps, which in the unfolded position are lockable so as to fix the parts of the handlebar system, 3. A folding bicycle as defined in claim 1 wherein in the lower parts of the handlebar system two bearing frames are provided hingeably and can be locked with the upper edge of the short standing beam such that they form a parcel carrier.

4. A folding bicycle comprising: a frame of three parts hingeable with respect to one another, the three parts including a front part, a center part and a rear part, said front part being provided with a hingeably attached short standing beam carrying a foldable handlebar system and with a front wheel support carrying a front wheel, said center part being provided with a movable saddle supporting beam and a treadle mechanism, and said rear part being provided with a rear wheel support carrying a rear wheel; a drive member which is bendable in two directions and connecting said treadle mechanism to said rear wheel, and a tensioning construction connected to said frame parts for locking and tensioning said frame parts in the stretched position.

5. A folding bicycle according to claim 4 wherein said tensioning construction is mounted substantially in the interior of said frame parts.

6. A folding bicycle according to claim 4 wherein said drive member comprises a cable.

7. A folding bicycle according to claim 4, wherein said tensioning construction also fixes said saddle supporting beam in said center frame part in its highest position.

* * * * *